United States Patent [19]

Schaars

[11] Patent Number: 5,451,154
[45] Date of Patent: Sep. 19, 1995

[54] SCRAPING PLUNGER

[75] Inventor: Hendrikus J. M. Schaars, Gendt, Netherlands

[73] Assignee: Fico B.V., Herwen, Netherlands

[21] Appl. No.: 244,740

[22] PCT Filed: Dec. 16, 1992

[86] PCT No.: PCT/EP92/02991

§ 371 Date: Jun. 13, 1994

§ 102(e) Date: Jun. 13, 1994

[87] PCT Pub. No.: WO93/11925

PCT Pub. Date: Jun. 24, 1993

[30] Foreign Application Priority Data

Dec. 17, 1991 [NL] Netherlands .............. 9102108

[51] Int. Cl.6 .................. B29C 45/02; B29C 45/14
[52] U.S. Cl. .................. 425/129.1; 425/544; 425/DIG. 228; 264/272.17
[58] Field of Search ..... 425/116, 544, 588, DIG. 228, 425/129.1; 264/272.17

[56] References Cited

U.S. PATENT DOCUMENTS

| | | | |
|---|---|---|---|
| 2,873,499 | 3/1957 | Billen | 425/544 |
| 3,800,385 | 4/1974 | Douglas | 264/192 |
| 4,708,613 | 11/1987 | Sera et al. | 425/117 |
| 4,900,485 | 2/1990 | Murakami | 425/116 |
| 4,909,724 | 3/1990 | Sonoda et al. | 425/544 |

FOREIGN PATENT DOCUMENTS

| | | |
|---|---|---|
| 428792 | 11/1989 | European Pat. Off. . |
| 2242223 | 3/1975 | France . |
| 2318025 | 2/1977 | France . |
| 1103011 | 3/1961 | Germany . |
| 58-98232 | 6/1983 | Japan . |
| 61-29133 | 2/1986 | Japan . |
| 61-167516 | 7/1986 | Japan . |

*Primary Examiner*—Khanh P. Nguyen
*Attorney, Agent, or Firm*—Limbach & Limbach; W. Patrick Bengtsson

[57] ABSTRACT

An apparatus for encapsulating with plastic lead frames having chips arranged thereon includes mutually movable mold halves (102, 103). In the closed position a mold cavity is bounded, in which molding material is arranged under pressure via a runner. the pressure is provided by a plunger-cylinder (134-133) which carries up the molding material. Leaking molding material can result in adhering of the plunger to the cylinder wall, which is prevented according to the invention in that the outer wall of the plunger (134) is provided with scraping edges which scrape clean the inner wall of the cylinder (133) during operation.

4 Claims, 5 Drawing Sheets

SCRAPING PLUNGER

The invention relates to an apparatus for encapsulating with plastic lead frames having chips arranged thereon, comprising mutually movable mould halves which bound a mould cavity in the closed position, a runner connecting onto the mould cavity for feeding moulding material and a plunger-cylinder connecting onto the runner for carrying up the moulding material under pressure.

Such an apparatus is known from, among others, the European patent application no. 89.203003.2.

The problem with this known apparatus is that material can leak along the plunger which carries up the moulding material, which can result in adhering of the plunger to the cylinder wall. This has the consequence of considerable wear and operational disturbances.

The invention has for its object to find a solution herefor.

This is achieved according to the invention in that the outer wall of the plunger is provided with scraping edges.

As a result of the steps according to the invention the inner wall of the cylinder is scraped clean during operation such that adhering no longer occurs.

The outer wall of the plunger is preferably provided with helical grooves.

The depth of the grooves increases as seen in the direction from the drive side of the plunger.

With the plunger according to the invention a comparatively large guide surface is obtained between plunger and inner wall cylinder, while due to the helically running grooves a sharp scraping edge is still achieved for scraping away the plastic material that can result in adhering.

The plunger is preferably driven by a drive rod which is pivotally coupled to the plunger. The pivot point between the plunger and the drive rod is preferably formed by a ball joint.

The invention will be elucidated with reference to the drawings.

Figure 1:
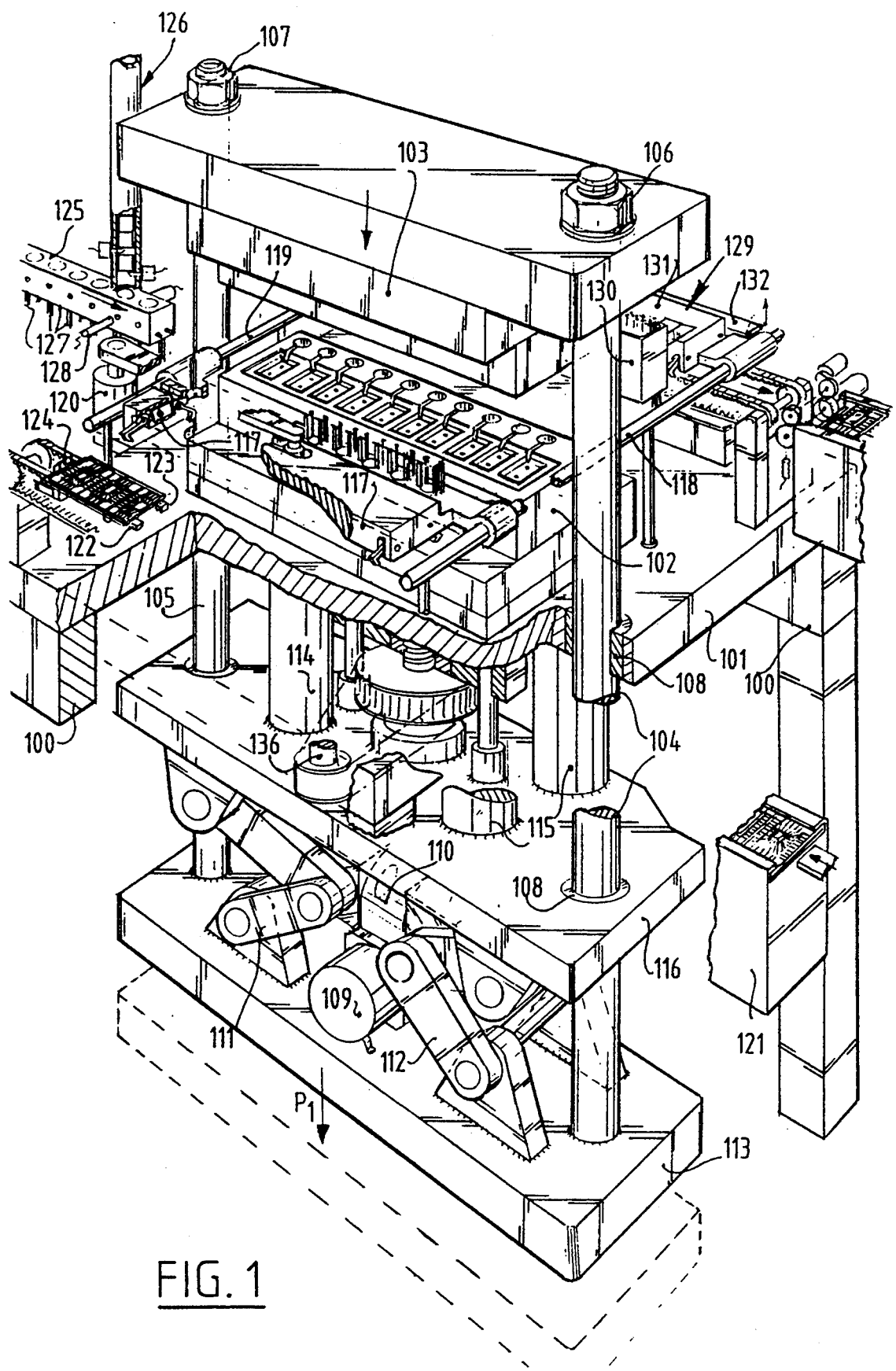
FIG. 1 shows a cut away view of the apparatus according to the invention.

A description of the moulding apparatus according to the invention will be given with reference to FIG. 1 and 2.

Mounted on the frame 100 of the machine is a fixedly positioned table 101. The table 101 bears a fixed lower mould half 102. The upper mould half 103 is movable relative to the lower half 102 using pull rods 104, 105 which are connected to the upper half 103 by the respective nut connections, 106, 107. The pull rods 104, 105 are movable relative to the fixed table 101 via bearings, for example 108.

The driving of the upper half of the mould 103 takes place from an electromotor 109. The angle lever systems 111, 112 are driven by means of the worm box 110. The angle lever systems are coupled on the one side to a movable underplate 113 and on the other side to a plate 116 fixedly connected to the table 101 by means of columns 114, 115. When the electromotor rotates the underplate 113 is moved vertically, for example in the direction of the arrow P1, which movement is transmitted via the pull rods 104, 105 onto the upper mould half 103. At the end of the stroke the arms of the angle lever system 111, 112 lie practically in one line so that a very great closing force is achieved.

The input carriage 117 is movable over the guide rails 118, 119. The driving of the input carriage 117 takes place from the electromotor 120.

Lead frames are supplied from a supply cassette and are carried up over belts 122, 123 as far as a stop 124. During the position of the input carriage outside the mould the input carriage is filled from a so-called pellet-filling carriage 125 with pellet-shaped moulding material which is taken from a supply reservoir 126. For a reliable take-over of pellet-shaped moulding material by the input carriage 117 from the pellet transporting carriage 125 use is made in both carriages of pin-shaped guiding means 127. The mutual movements are controlled using a sensor 128.

The cleaning-discharge unit 129 is likewise movable over the rails 118, 119 between the position outside the mould die and the position inside the mould die. The unit 129 consists of a cleaning-brushing device 130 and a discharge member 131. The cleaning device 130 brushes both mould halves after use and simultaneously sucks up brushed-off remnants. Co-acting with the unit is a break-off plate 132 which subjects the finished product to an after-processing.

Figure 2:
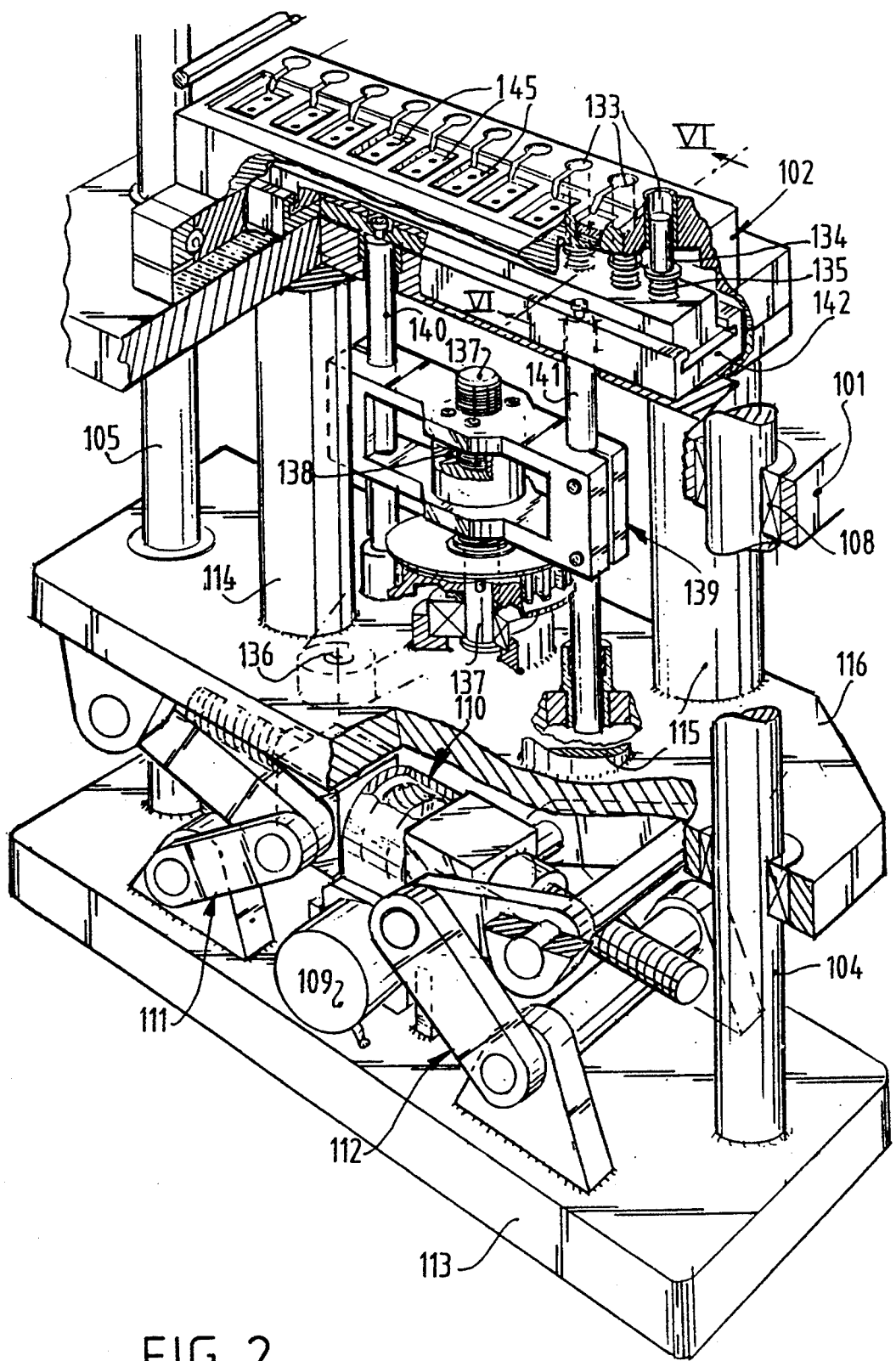
FIG. 2 shows on a larger scale a detail of the lowermost part of the moulding apparatus according to FIG. 1.

As can be seen in FIG. 2, the cavities 133 in the lower half 102 of the mould are each provided with a plunger 134 which is biased by a spring washer 135 such that the position of the plunger is adapted to the quantity of moulding material in the relevant cavities 133. The plungers are driven from an electromotor which drives a screwed rod 137 via the speed control 136. A nut 138 is placed on the screwed rod so that the rotating movement is converted into a vertically directed movement of the frame 139. Fixedly coupled to the frame are the drive rods 140, 141 for the plunger bracket 142 which in turn drives the plungers.

Pellet-shaped moulding material is compressed during the ascending movement of the plunger and transported via a runner to the cavity 145 in the lower half of the mould where the chip is arranged.

Figure 3A:
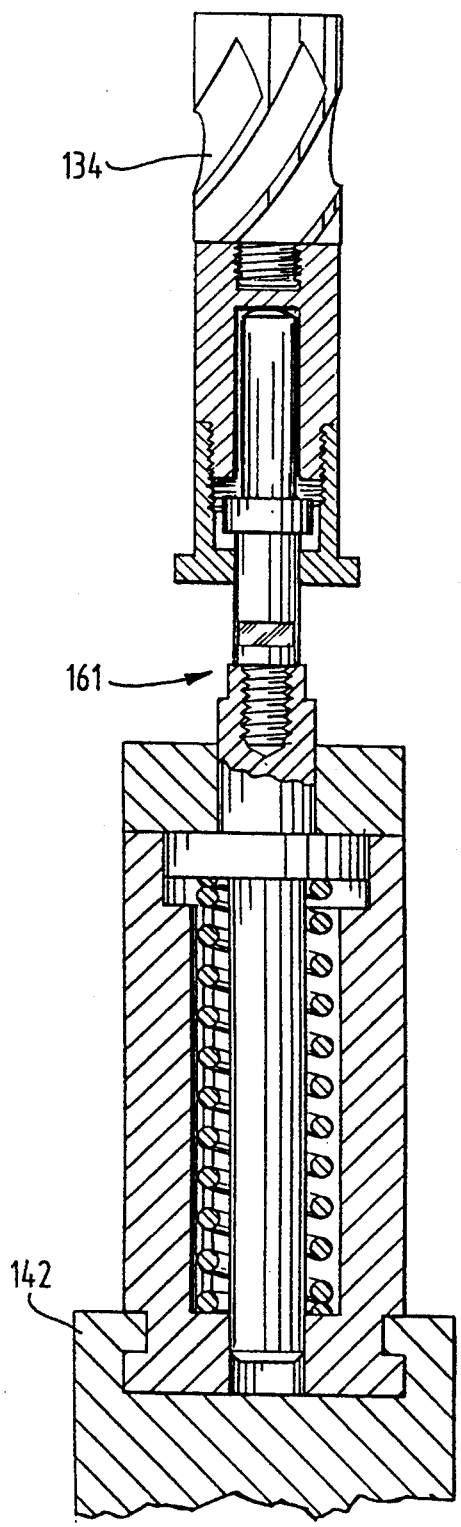
FIG. 3a and 3b show sectional views of the plunger and plunger bar according to the invention.
Figure 3B:
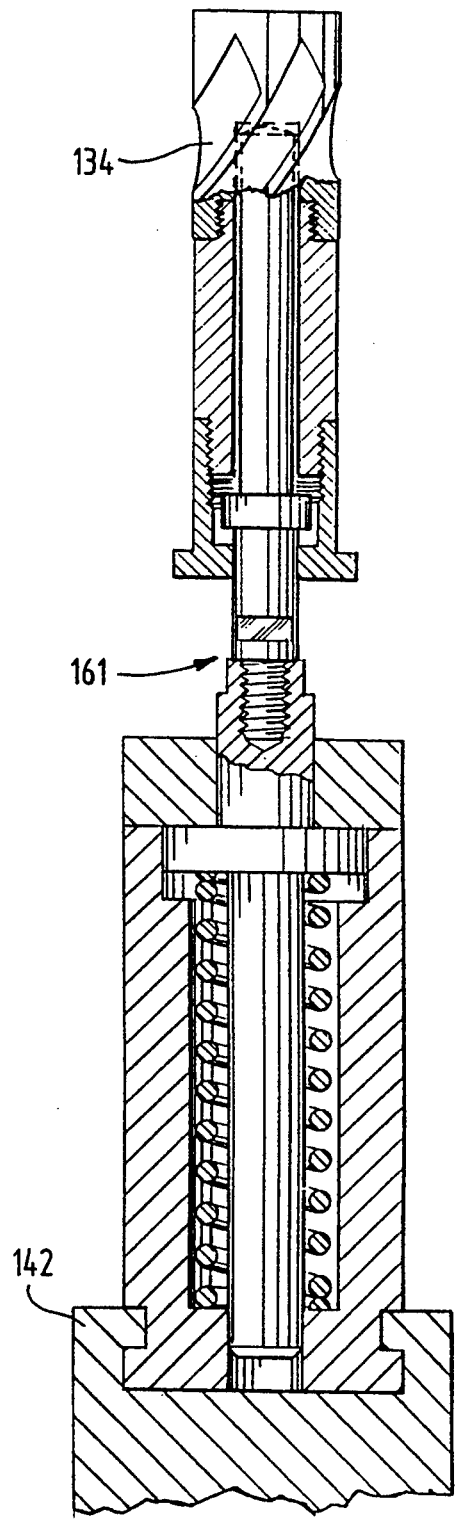
Figure 4:
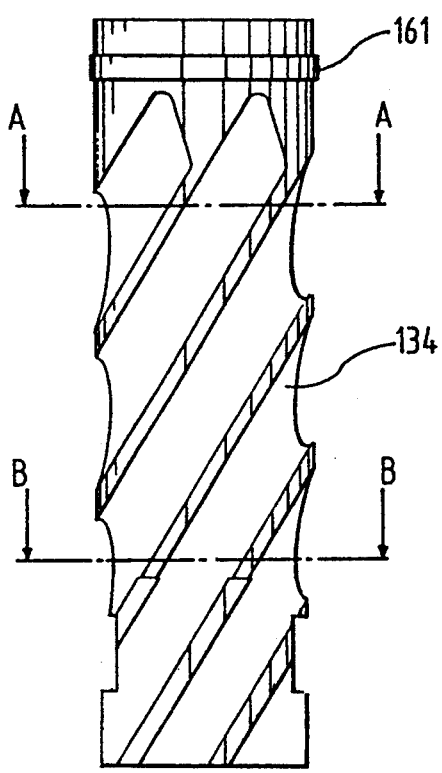
FIG. 4 shows a view of the plunger according to the invention.
Figure 5A:
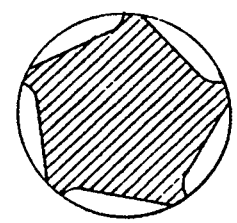
FIG. 5 shows respectively a view along the line A—A and B—B in FIG. 4.
Figure 5B:
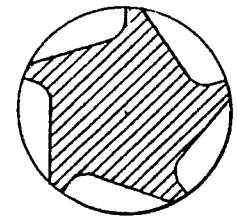

The plunger 134 according to the invention has a helical form (see FIG. 4) which functions as scraping edge, with the understanding that at the top a disc-like portion is present in which is arranged a piston ring 161 of plastic. The grooves (see FIG. 5) become broader towards the drive side (in the drawing at the bottom). As can be seen in FIG. 3a and 3b, the coupling to the drive shaft 160 is respectively a rigid coupling and a flexible coupling.

Figure 6:
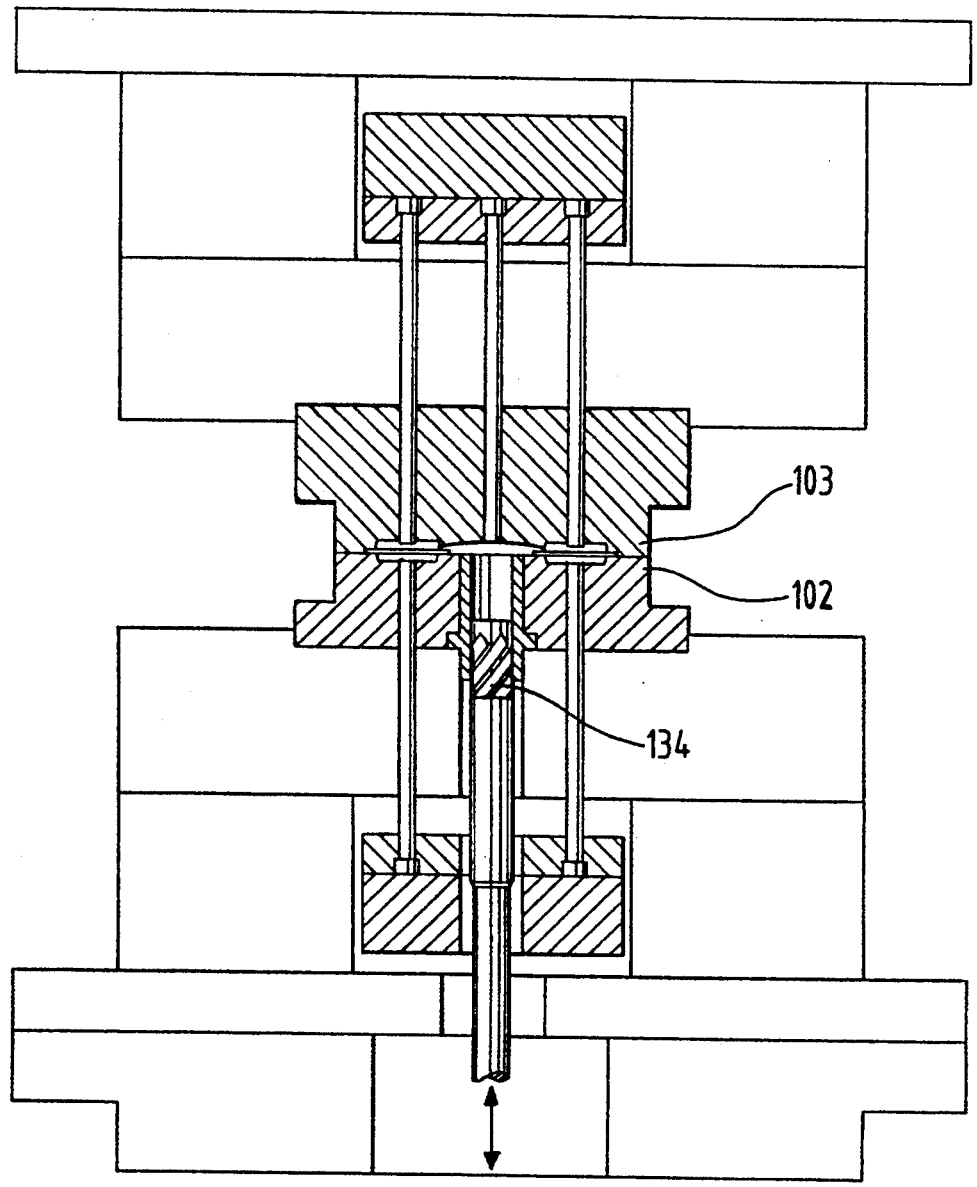
FIG. 6 shows a sectional view.

Reference is finally made to FIG. 6 which is a cross-sectional view of the plunger-cylinder according to the invention with outer wall provided with helical grooves.

I claim:

1. An apparatus for encapsulating with plastic lead frames having chips arranged thereon comprising mutually movable mould halves which bound a mould cavity in the closed position, a runner connecting onto the mould cavity for feeding moulding material and a plunger cylinder connecting onto the runner for carrying up the moulding materials under pressure, wherein the outer wall of the plunger is provided with scraping edges, has helically running grooves and the depth of the grooves increases as seen from the drive side of the plunger.

2. An apparatus as claimed in claim 1, wherein the plunger is driven by a drive rod which is pivotally coupled to the plunger.

3. An apparatus as claimed in claim 2, wherein the pivot point between the plunger and the drive rod is formed by a ball joint.

4. An apparatus for encapsulating lead frames with plastic comprising:

- mutually movable mould halves which bound a mould cavity in a closed position;
- a runner;
- a plunger having a drive side and a mould side, for moving moulding material to said mould cavity via said runner, wherein the outer wall of said plunger comprises helically running grooves and scraping edges, and the depth of said grooves increases toward the drive side.

* * * * *